United States Patent [19]
Huber

[11] Patent Number: 5,400,166
[45] Date of Patent: Mar. 21, 1995

[54] COMMUNICATION OF SIGNALS SHARING A SINGLE OPTICAL SOURCE

[75] Inventor: David R. Huber, Warrington, Pa.

[73] Assignee: General Instrument Corporation, Hatboro, Pa.

[21] Appl. No.: 963,461

[22] Filed: Oct. 20, 1992

[51] Int. Cl.⁶ ............................................. H04B 9/00
[52] U.S. Cl. ..................... 359/173; 359/115; 359/125; 359/127; 359/134; 359/188
[58] Field of Search ............... 359/173, 115, 124, 125, 359/126, 127, 132, 133, 134, 160, 188; 358/12, 13, 14, 15, 86, 141, 142, 84, 143, D901; 385/48, 1, 2, 4, 8; H04N 7/22; 455/3.1, 3.3, 4.2, 6.1, 6.2

[56] References Cited

U.S. PATENT DOCUMENTS

| | | | |
|---|---|---|---|
| 4,635,246 | 1/1987 | Taylor et al. | 370/3 |
| 4,658,394 | 4/1987 | Cheng et al. | 370/3 |
| 4,860,279 | 8/1989 | Falk et al. | 359/115 |
| 4,866,698 | 9/1989 | Huggins et al. | 359/115 |
| 5,153,762 | 10/1992 | Huber | 359/125 |
| 5,210,631 | 5/1993 | Huber et al. | 359/132 |
| 5,212,579 | 5/1993 | Huber et al. | 359/182 |
| 5,235,604 | 8/1993 | Chinen | 372/2 |
| 5,243,617 | 9/1993 | Pocholle et al. | 372/6 |
| 5,245,467 | 9/1993 | Grasso et al. | 372/2 |
| 5,268,910 | 12/1993 | Huber | 372/6 |

OTHER PUBLICATIONS

"Transmission of HDTV and Audio Signals Over One Single Mode Fiber" by P. S Natarajan, P. S. Venkatesan, M. D. Avstin, J. Orost, C. G. Forbes *SMPTE Journal*, Sep. 1989, pp. 651–657.

Primary Examiner—Richard E. Chilcot, Jr.
Assistant Examiner—Richard A. Moller
Attorney, Agent, or Firm—Barry R. Lipsitz

[57] ABSTRACT

A single optical source is shared by a plurality of optical communication paths to communicate different information signals on the different paths. A high power optical carrier generator provides a carrier signal to an optical multiplexer. The multiplexer splits the optical carrier into a plurality of paths, each including an external optical modulator. The external optical modulator in each path is used to modulate the carrier in its respective path by a desired information signal. An additional modulated optical carrier can be coupled to one or more of the optical communication paths for the communication of additional information such as a standard set of television channel signals in a cable television network.

10 Claims, 1 Drawing Sheet

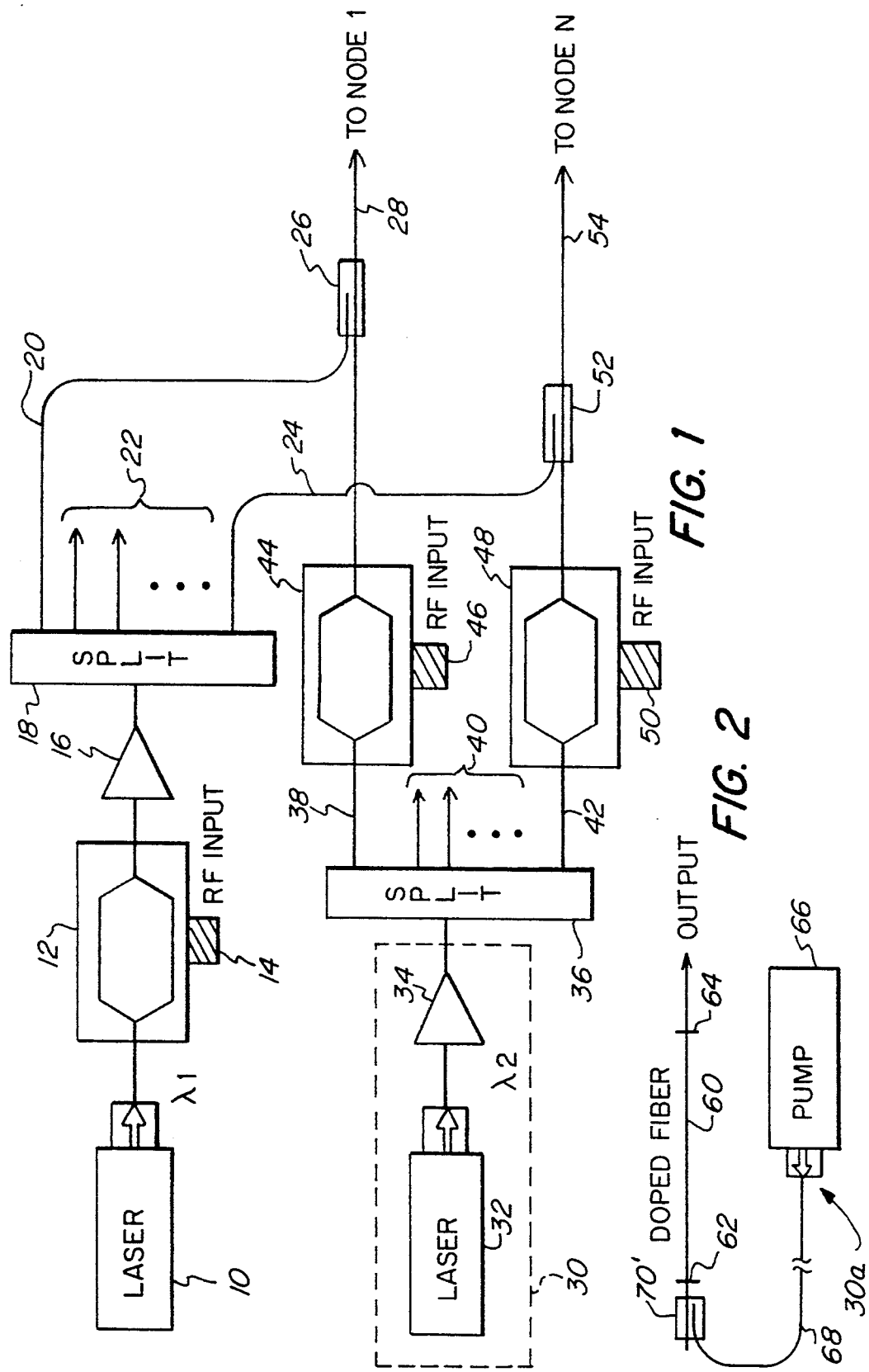

COMMUNICATION OF SIGNALS SHARING A SINGLE OPTICAL SOURCE

BACKGROUND OF THE INVENTION

The present invention relates to optical fiber communication systems, and more particularly to a method and apparatus for sharing an optical source among a plurality of external optical modulators provided in different communication paths.

Optical fiber communication systems are well known. Such systems are enjoying increasing use in the telecommunications industry, in the cable television industry, and in local area networks used to couple personal computers and/or workstations together.

In the cable television industry, signal distribution via coaxial cable has dominated to date. Such systems are typically arranged in tree and branch networks that carry television program signals from a headend to various nodes that ultimately feed the cable signals to individual subscriber homes. Typically, the headend provides a single optical carrier signal that is modulated by RF subcarriers containing a plurality (e.g., 40–80) different television program channels. The carrier is communicated via the distribution path to individual subscriber homes, each of which receive the same television channel signals.

In certain situations, such as narrowcasting, it is desired to provide different programming to different subscribers. In narrowcasting, programming is directed to smaller audiences with special tastes, such as those who want foreign movies, folk music, performing arts, and the like. Although the provision of narrowcasting services can result in additional pay subscriptions for a cable system operator, in the past the incremental costs to the operator for implementing a narrowcasting system have tended to outweigh the incremental gains.

In an optical fiber distribution system, the provision of narrowcasting services has required separate signal lasers to generate a separate carrier for each band of narrowcast program channels that is to be added to the core channels offered to all subscribers. The need to provide a separate optical source for each category of narrowcast channels increases the cost and complexity of the distribution system. This has hampered the implementation of narrowcasting in emerging optical fiber distribution systems.

It would be advantageous to provide an optical fiber communication system that enables narrowcasting and other specialized programming schemes to be achieved at a relatively low cost with high system reliability. It would be further advantageous to provide such a system that utilizes known optical components and provides a high degree of flexibility in establishing, maintaining and revising the signal distribution plant. The present invention provides a method and apparatus for sharing an optical source among a plurality of different external optical modulators, thereby achieving the aforementioned advantages.

SUMMARY OF THE INVENTION

In accordance with the present invention, apparatus is provided for communicating information over a plurality of optical communication paths using a single optical source. A high power optical carrier generator outputs an optical carrier of sufficient power to carry signals over a plurality of different paths. Optical splitter means are coupled to receive an optical carrier from the optical carrier generator and distribute the carrier to a plurality of optical communication paths. External optical modulator means are provided in each of the optical communication paths for modulating the carrier in the respective path by a respective information signal. Each information signal can comprise, for example, a plurality of different cable television channels.

The apparatus can further comprise means for coupling an additional modulated optical carrier to at least one of the optical communication paths. In this manner, additional information (e.g., an additional group of television channels) can be communicated over the optical communication path.

In one illustrated embodiment, the optical carrier generator comprises a laser followed by an optical amplifier. An example of such an amplifier is an optical fiber amplifier, such as an erbium fiber amplifier. In another illustrated embodiment, the optical carrier generator comprises an optical fiber laser that is pumped to provide a high output power. The pump energy for the optical fiber laser can be provided by a remotely located pump source via an optical fiber.

The present invention also provides a method for communicating information over a plurality of optical communication paths using a single optical source. A high power optical carrier is generated. The carrier is distributed to a plurality of optical communication paths. In each of the paths, the carrier is externally modulated by an information signal to be carried on the respective path. An additional modulated optical carrier can be coupled to one or more of the paths for communication of additional information.

In one embodiment, the step of generating a high power optical carrier can comprise the step of amplifying the output of a laser using an optical amplifier. In another embodiment, the generating step comprises the step of pumping an optical fiber laser to provide a high output power. In the latter embodiment, the pumping step can provide pump energy from a remote location.

BRIEF DESCRIPTION OF THE DRAWINGS

FIG. 1 is a schematic illustration of an embodiment of the invention using a laser followed by an optical amplifier to provide a source of optical energy shared by a plurality of external optical modulators; and FIG. 2 is a schematic diagram of an alternative optical source utilizing an optical fiber laser.

DETAILED DESCRIPTION OF THE INVENTION

In certain applications, such as narrowcasting, it is desirable to transmit different groups of information signals along different communication paths. In an optical communication system, this result can be achieved in accordance with the present invention by providing a single optical source that is used to provide carriers for different communication paths. By providing an external modulator in each of the communication paths, each path can be used to carry different information signals.

An example of such a system is illustrated in FIG. 1, which for purposes of illustration is explained herein in connection with the distribution of cable television signals. It should be appreciated that the present invention has application in any type of optical communication system wherein information signals are communicated via an optical carrier signal.

In the embodiment shown in FIG. 1, a first laser 10 that outputs an optical carrier of wavelength $\lambda_1$ is used to provide an optical carrier for input to an external modulator such as Mach Zehnder modulator 12. A radio frequency (RF) information signal is input to the modulating input port 14 of the Mach Zehnder modulator 12 in a conventional manner. The RF information signal can comprise, for example, a band of 40 or more standard cable television channels that are to be broadcast throughout a cable television system. The optical carrier modulated by the information signal is amplified in a conventional optical amplifier 16 for input to an optical splitter 18. Optical splitter 18 outputs the modulated carrier signal on a plurality of optical communication paths 20, 22, 24 for distribution to subscribers. Such distribution can be provided, for example, using a conventional tree and branch structure as well known in the cable television art. Since the splitter 18 merely splits the modulated carrier output from amplifier 16 into a plurality of paths, it will be clear that each of the paths 20, 22, 24 will contain the identical set of channel signals.

In accordance with the present invention, it is possible to selectively add additional information signals to the set of channel signals output on each path from splitter 18, for distribution along different optical paths. It is also possible to provide paths containing information signals that are not combined with the information signals output from splitter 18. The present invention provides this capability using a single optical source for the specialized sets of information signals.

A high power optical carrier generator generally designated 30 comprises a laser 32 which outputs an optical carrier at wavelength $\lambda_2$ followed by an optical amplifier 34. Optical amplifier 34 can comprise, for example, an optical fiber amplifier such as an erbium fiber amplifier. Rare earth doped optical amplifiers such as erbium amplifiers can be used to inexpensively generate optical signal power. Thus, by following laser 32 with amplifier 34, a high power optical carrier generator is provided.

The output of carrier generator 30 is coupled to a splitter 36 that is similar to splitter 18. This splitter splits the optical carrier output from generator 30 into a plurality of separate optical communication paths 38, 40, 42. The number of such paths is only limited by the output power of generator 30 and the number of output ports provided by splitter 36.

In accordance with the present invention, each of the optical paths containing the carrier signal from carrier generator 30 is provided with an external optical modulator. For example, path 38 illustrated in FIG. 1 contains a Mach Zehnder modulator 44. Path 42 contains a Mach Zehnder modulator 48. Each of the additional paths collectively designated 40 would also be provided with an external optical modulator.

The provision of an external optical modulator in each path enables separate information signals to be carried on each path. For example, an information signal comprising a plurality of specialized cable television channels can be input to modulating input port 46 of modulator 44. The information signal will modulate the optical carrier carried on path 38, for output via path 28 to a node (node 1) of a distribution system that is used to distribute the information signal to specific subscribers. A conventional optical coupler 26 is used to couple the standard channel signals from optical path 20 with the specialized (i.e., narrowcast) channel signals input to port 46 of modulator 44.

Similarly, the optical carrier on path 42 can be modulated by an entirely different set of channel signals input to optical modulator 48 via modulating input port 50. These narrowcast signals can be combined in a conventional coupler 52 with the standard channel signals output from multiplexer 18 on path 24. Thus, communication path 54 will carry the standard signals from modulator 12 and the specialized signals from modulator 48 to a desired node (node N) of the distribution system.

It should be appreciated that the system of the present invention is extremely versatile, and can provide any number of signal distribution paths carrying any desired set or subset of channel signals. In an instance where only a few specialized channel signals are to be communicated to a particular node, the standard signals output from multiplexer 18 would not be coupled into the communication path that carries the specialized signals.

FIG. 2 illustrates an alternate embodiment of an optical carrier generator generally designated 30a, in which a fiber laser comprises a doped optical fiber 60 between reflectors 62, 64. Fiber 60 is coupled via a coupler 70 to a pump source 66. If desired, the pump source 66 can be remotely located from the fiber laser, and the pump energy communicated to the fiber laser via an optical fiber 68 that can carry the pump energy for distances of up to several kilometers or more.

In accordance with the present invention, pump source 66 is a high power pump to provide a high power output from the fiber laser. Doped fiber 60 can comprise a rare earth doped fiber, such as an erbium fiber. Such fiber lasers are well known in the art. In order to use the optical carrier generator of FIG. 2 in the present invention, the output of the fiber laser is input to splitter 36 (FIG. 1) in place of the output from optical carrier generator 30.

It should now be appreciated that the present invention provides apparatus for communicating different information signals over different optical communication paths, all sharing a common optical carrier generator. The optical carrier generator can comprise, for example, a laser, such as a semiconductor laser, followed by an optical amplifier. Alternatively, the optical carrier generator can comprise a fiber laser pumped at a high power level to provide a desired high output power. The carrier produced by the optical carrier generator is split into a plurality of optical communication paths, each containing a separate external modulator for modulating the carrier in the path by a desired information signal. Well known optical engineering techniques are used to ensure that the correct optical polarization reaches the external modulators from the optical carrier generator.

Although the invention has been described in connection with various specific embodiments, those skilled in the art will appreciate that numerous adaptations and modifications may be made thereto without departing from the spirit and scope of the invention as set forth in the claims.

I claim:

1. Apparatus for communicating information over a plurality of optical communication paths using a single optical source comprising:

an optical source for generating an optical signal having sufficient power to be split into a plurality of identical carriers for distributing information signals over a plurality of optical communication paths;

an optical splitter coupled to said source to receive and split said optical signal into said plurality of identical carriers for communication of each one of said carriers over a corresponding one of said plurality of optical communication paths;

a plurality of external optical modulators, each provided in a different one of said optical communication paths, for modulating the carrier in the respective path by a respective information signal; and means for coupling an additional modulated optical carrier to at least one of said optical communication paths for communication of at least one additional information signal over said at least one path.

2. Apparatus in accordance with claim 1 wherein said optical source comprises a laser followed by an optical amplifier.

3. Apparatus in accordance with claim 2 wherein said amplifier is an optical fiber amplifier.

4. Apparatus in accordance with claim 3 wherein said amplifier is an erbium fiber amplifier.

5. Apparatus in accordance with claim 1 wherein said optical source comprises an optical fiber laser pumped to provide a high output power.

6. Apparatus in accordance with claim 5 wherein said optical fiber laser has a pump input coupled to an optical fiber for receiving pump energy from a remotely located pump source.

7. A method for communicating information over a plurality of optical communication paths using a single optical source comprising the steps of:

generating a high power optical signal having sufficient power to be split into a plurality of identical carriers for distributing information signals over a plurality of optical communication paths;

splitting said signal into said plurality of identical carriers for communication of each one of said carriers over a corresponding one of the plurality of optical communication paths; and externally modulating each carrier in its respective optical communication path by an information signal to be distributed on that path; and coupling an additional modulated optical carrier to at least one of said optical communication paths for communication of at least one additional information signal over said at least one path.

8. A method in accordance with claim 7 wherein said generating step comprises the step of amplifying the output of a laser using an optical amplifier to provide said high power optical signal.

9. A method in accordance with claim 7 wherein said generating step comprises the step of pumping an optical fiber laser to provide a high output power.

10. A method in accordance with claim 9 wherein pumping step provides pump energy to said optical fiber laser from a remote location.

* * * * *